United States Patent Office 3,069,315
Patented Dec. 18, 1962

3,069,315
PROCESS FOR OBTAINING AN ANESTHETIC
EFFECT AND COMPOSITION
Seymour L. Shapiro, Hastings on Hudson, Louis Freedman, Bronxville, and Harold Soloway, New Rochelle, N.Y., assignors to U.S. Vitamin & Pharmaceutical Corporation, a corporation of Delaware
No Drawing. Filed July 8, 1960, Ser. No. 41,498
9 Claims. (Cl. 167—52)

This invention relates to a process for obtaining an anesthetic effect, which includes administering certain amino-1-phenylethyl esters of α-phenoxyaliphatic acids and their acid salts, and to compositions useful for this purpose.

The process herein described employs esters of the following structural formula:

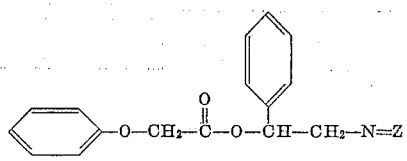

and the water-soluble nontoxic acid salts thereof, particularly the acid salts:

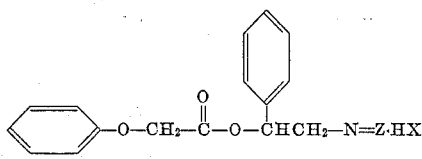

in which esters and salts N=Z is selected from the group consisting of 1-pyrrolidino and N-methylisopropylamino, and X is an acid anion, such as chloride, bromide, sulfate, nitrate, acetate, formate, and phosphate.

The structure of the N=Z group is quite important to anesthetic activity. N-dimethylamino, N-diethylamino, and N-allylmethylamino are ineffective, for example, although they are all homologues of N-methylisopropylamino.

The following examples show how the compounds of the invention are prepared:

EXAMPLE 1

(2-Pyrrolidino-1-Phenylethyl)Phenoxyacetate Hydrochloride

To a refluxing solution of 11.6 g. (0.06 mole) of phenoxyacetyl chloride in 100 ml. of benzene there was added a solution of 11.5 g. (0.06 mole) of 2-pyrrolidono-1-phenyl ethanol in 50 ml. of benzene over a period of 15 minutes. Heating and stirring were continued for two hours after addition was complete. When cool, the product which had formed was separated. There was obtained 19.8 g. (91%), melting at 202–205° C. After recrystallization (ethanol), the product melted at 205–206° C.

Analyses.—Calculated for $C_{20}H_{24}ClNO_3$: C, 66.38; H, 6.68; N, 3.87. Found: C, 66.42; H, 6.73; N, 3.70.

EXAMPLE 2

(2-(N-Methyl-N-Isopropylamino)-1-Phenylethyl) Phenoxyacetate Hydrochloride

The method of Example 1 was used to prepare this compound, starting with 7.7 g. (0.04 mole) of 2-(N-methyl-N-i-propylamino)-1-phenylethanol, 6.8 g. (0.04 mole) of phenoxyacetyl chloride and 100 ml. of benzene. Filtration of the product yielded 13.5 g. (93%), melting at 186–187° C. After recrystallization (ethanol) the melting point was 187–188° C.

Analyses.—Calculated for $C_{20}H_{26}ClNO_3$: C, 66.01; H, 7.20; N, 3.85. Found: C, 65.95; H, 7.09; N, 4.06.

The compounds of the invention are evaluated by the method of Chance and Lobstein, J. Pharmacol., 82, 203 (1944), for determining the median effective dose of a local anesthetic when applied to the cornea of a guinea pig eye.

A known concentration of solution of the local anesthetic is applied to both eyes of a guinea pig and the eyes kept bathed with this solution for two minutes. The eyes are then blotted to remove excess solution.

Five minutes later, the eyes are tested for the anesthetic effect. A horse hair mounted on a glass rod is used. The hair is pressed against the center of the cornea so that the hair is bent to about the same extent at each application. The hair is applied ten times to each eye, and the process repeated five times for the test (total of 100 prods). The result is reported thus: 100 minus number of blinks=percent anesthesia.

Varying concentrations of the anesthetic agent are used and the percent anesthesia is plotted against concentration. The results are expressed as the $ED_{50}$ in mg./ml. which is the quantity of compound per milliliter of solution required to effect 50% anesthesia as established from the plot of concentration vs. percent anesthesia.

The toxicity of the individual compounds was established by administration subcutaneously (s.c.) to mice, in terms of the minimum dose required to be lethal to mice and expressed as $LD_{min.}$ in milligrams of compound per kilogram of mouse.

The therapeutic index was then calculated by dividing the $LD_{min.}$ by the $ED_{50}$, the result being a single figure embracing the anesthetic effectiveness of the compound and its inherent toxicity.

TABLE I

| Example No. | N=Z |
|---|---|
| A | $CH_3$–N–$CH_3$ |
| B | $C_2H_5$–N–$C_2H_5$ |
| 1 | $CH_2CH_2CH_2CH_2$–N |
| 2 | $(CH_3)_2CH$–N–$CH_3$ |

TABLE II
Anesthetic Potency of Compounds

| Example No. | $LD_{Min.}$ (mg./kg.) | $ED_{50}$ (mg./ml.) |
|---|---|---|
| A | >1,000 | >20 |
| B | 750 | 17.2 |
| 1 | 450 | 0.65 |
| 2 | 400 | 0.9 |
| Xylocaine | 225 | 6.8 |
| Procaine | 200 | 15 |

The compounds of the invention Examples Nos. 1 and 2 are potent anesthetics, much superior in activity to their homologues as well as xylocaine and procaine, well known anesthetic agents in use clinically.

The anesthetics of the invention can be administered by any of the conventional means available for use in conjunction with pharmaceuticals. They preferably are used in the form of a composition comprising a vehicle such as an organic solvent. Such compositions include sterile solutions for irrigation, intravenous administration and subcutaneous injection, and dispersions of the compounds in an oil emulsion, jelly or cream base, either alone or in combination with other therapeutic agents such as antihistamines, sulfa drugs and antibiotics. All such are included herein in the term "vehicle."

The concentration of the active ingredient is not critical, and can be varied as desired to meet the need. The concentration will depend in part upon the amount of the composition that is conveniently administered. A lesser amount of a sterile solution would be administered intravenously or subcutaneously than might be applied topically in the form of an oil, emulsion, jelly or cream. In most cases, concentrations ranging from 0.001% to about 5% will be quite adequate.

Useful pharmaceutical formulations for administration of the compounds of the invention are as follows:

FORMULA A

Solution for intravenous or subcutaneous administration:

|  | Percent |
|---|---|
| Active ingredient | 1 |
| Benzyl alcohol | 0.9 |
| Water for injection, q.s. | |

FORMULA B

Gelled composition:

|  | Percent |
|---|---|
| Active ingredient | 1 |
| Methocel | 4.25 |
| Propylene glycol | 20 |
| Distilled water, q.s. | |

FORMULA C

Cream:

|  |  |
|---|---|
| Active ingredient | 1 |
| Propylene glycol | 57 |
| Carbowax 6000 | 42 |

The compounds of the invention can also be employed in the form of troches and lozenges, and they can be dispensed as dry powders suitable for admixing in a pharmaceutical carrier immediately prior to administration.

When used for the treatment of mucous membrane anesthesia, the active ingredient is best incorporated in an aqueous spray. This spray is prepared by dissolving the compound in water, bringing the pH to within the range of about 6.5 to about 7.2, preferably 6.7 to 7.1, with a base such as alkali metal hydroxide, for example, sodium hydroxide. Effective anesthesia is obtained with a concentration as low as 0.5% (w./v.), but it is usually preferable to employ somewhat more, within the range from about 1% to about 5%. Preservatives such as methyl paraben or propylene paraben can also be incorporated.

This application is a continuation-in-part of our co-pending application Serial No. 727,046, filed April 8, 1958, now abandoned.

It is to be understood that it is intended to cover all changes and modifications of the examples of the invention herein chosen for the purpose of illustration which do not constitute departures from the spirit and scope of the invention.

We claim:

1. A process for anesthetizing which comprises administering as an anesthetic a compound selected from the group consisting of esters having the formula:

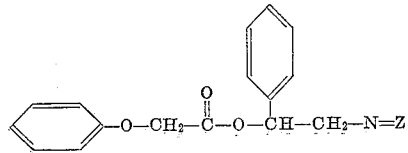

and the acid salts thereof:

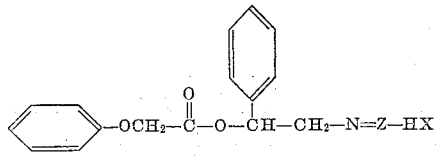

in which N=Z is selected from the group consisting of 1-pyrrolidino and N-methylisopropylamino, and X is a nontoxic acid anion.

2. A process in accordance with claim 1 in which the compound is:

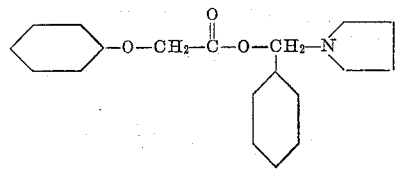

3. A process in accordance with claim 2, in which the said compound is the hydrochloric acid salt.

4. A process in accordance with claim 1 in which the compound is:

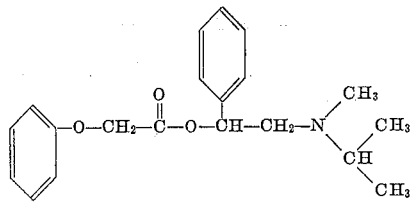

5. A process in accordance with claim 4, in which the said compound is the hydrochloric acid salt.

6. A composition for obtaining an anesthetic effect comprising a vehicle and a compound selected from the group consisting of esters having the formula:

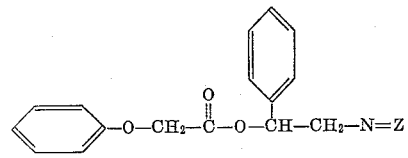

and the acid salts thereof:

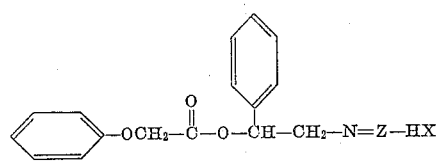

in which N=Z is selected from the group consisting of 1-pyrrolidino and N-methylisopropylamino, and X is a nontoxic acid anion.

7. A composition in accordance with claim 6, in which the vehicle is an organic solvent.

8. A composition in accordance with claim 6, in which the vehicle is a gel.

9. A composition in accordance with claim 6, in which the vehicle is a cream emulsion.

References Cited in the file of this patent

UNITED STATES PATENTS 2,628,973    Cusic _____ Feb. 17, 1953